July 19, 1927.  
W. L. HANLEY, JR  
1,636,417  
PROCESS OF FIRING CERAMIC PRODUCTS  
Original Filed April 13, 1926
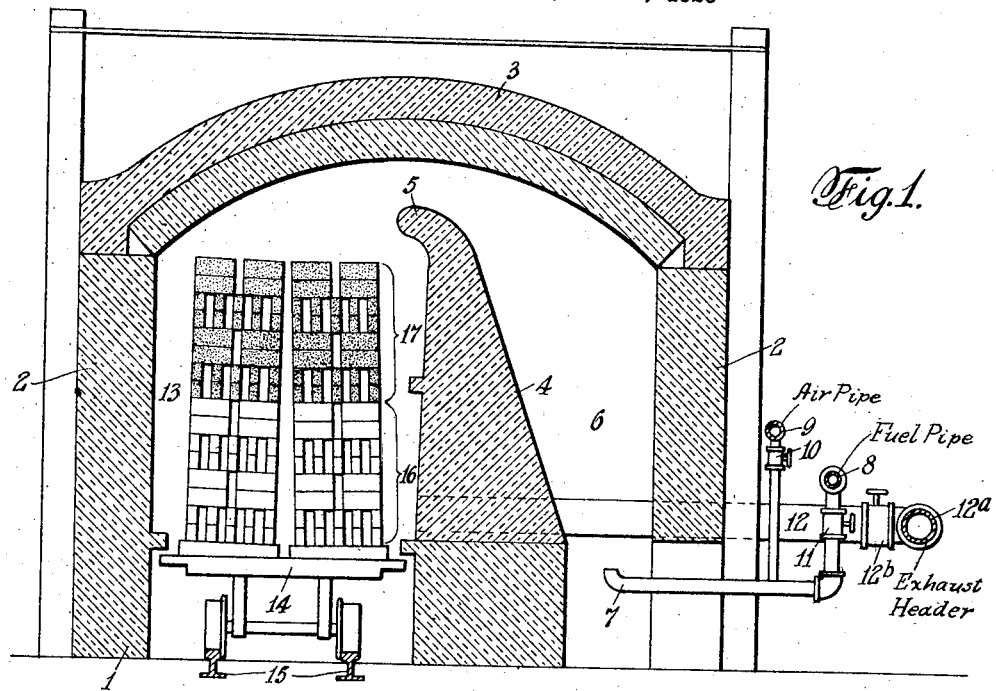
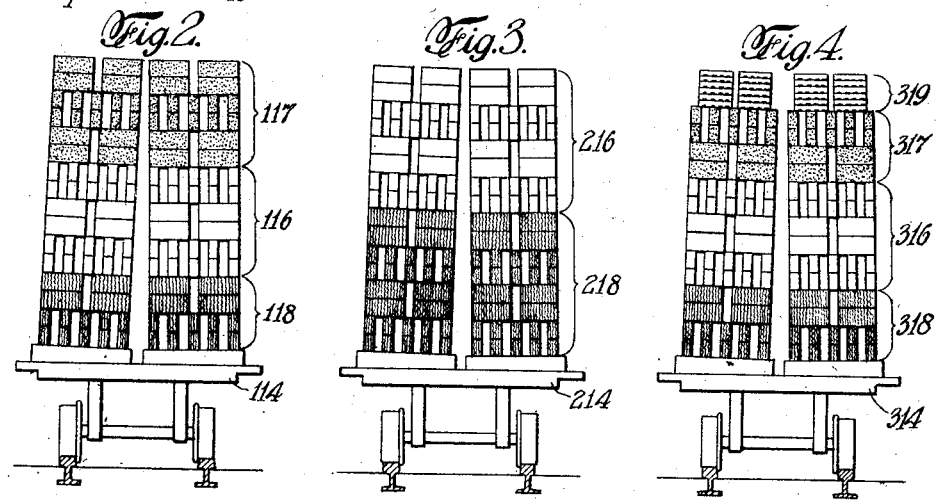
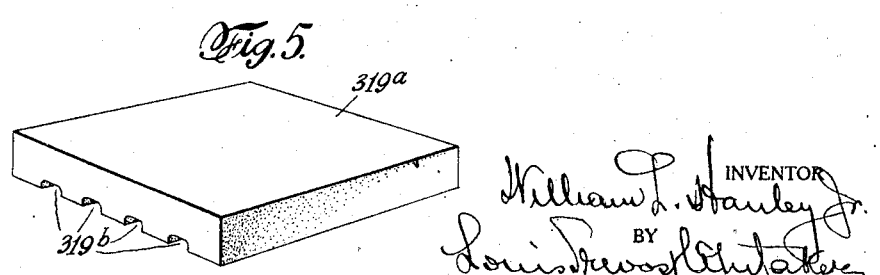
INVENTOR  
William L. Hanley Jr.  
BY  
ATTORNEY Patented July 19, 1927.

1,636,417

UNITED STATES PATENT OFFICE.

WILLIAM LEE HANLEY, JR., OF BRADFORD, PENNSYLVANIA.

PROCESS OF FIRING CERAMIC PRODUCTS.

Application filed April 13, 1926, Serial No. 101,678. Renewed December 22, 1926.

My invention consists in the novel features hereinafter described and illustrated in the accompanying drawing which shows several ways in which my invention may be carried into effect.

In the operation of tunnel kilns for firing bricks, the bricks are "hacked" in superposed layers on tunnel cars and are moved slowly through the kiln, during the period required to pre-heat and water-smoke them, preparatory to the actual firing, to fire the brick and permit them to cool to a considerable extent before they are removed. In the firing chamber of the kiln, which ordinarily occupies a central position with respect to the length of the kiln, it necessarily follows that the upper portion of the kiln chamber is heated to a higher temperature than the lower portions adjacent to the level of the car platform. It therefore follows that where the cars are loaded throughout with bricks of the same kind, there will be a variation in color, those in the upper layers being somewhat darker than those in the lower layers. This frequently necessitates sorting the finished product in order to meet the requirements as to color of different purchasers, and where several different kinds of bricks are being manufactured in a plant, and the cars are loaded with bricks of the same kind throughout the different layers, it results that the plant will have various shades of each kind of brick continually produced in the kiln. This may be extremely disadvantageous as where there is a large demand for bricks of a certain kind in a particular color, and may result in an oversupply of bricks of certain kinds in certain colors beyond the requirements of the trade. This applies particularly to stiff mud bricks in various finishes, as faced brick, smooth finish brick and rough finish, for example, all of which are made from the same kind of clay by the stiff mud process.

In many plants it is also customary to make both stiff mud bricks and pressed bricks. Pressed bricks are made by compressing a nearly dry composition in suitable molds under heavy pressure into the desired form, while stiff mud bricks are made by forcing the clay in plastic condition through a mold of required shape to produce a rectangular block from which the individual bricks are severed, usually by means of a wire cutter or other suitable cutting means. The dry pressed brick is a closer or denser product and requires firing at a higher temperature, or for a longer period than the wire cut stiff mud brick, in order to effect the proper burning. For this reason, it is customary to burn dry pressed brick by themselves in order that the appropriate temperature or length of exposure to the required temperature may be provided to insure the proper burning, and the stiff mud brick are separately burned under the appropriate temperature condition. This is more or less inconvenient in the operation of any brick kiln making both kinds of brick and frequently necessitates additional handling and other additional expenses of operation in providing for the separate firing of dry pressed brick and wire cut stiff mud brick. For example, conditions may readily arise where it is necessary to manufacture pressed brick in larger quantity than is necessary to fill commercial requirements, in order to operate the kiln economically, and during the period that the kiln is utilized for burning pressed brick, the manufacture of the stiff mud brick is discontinued, and vice-versa.

In the operation of a tunnel kiln, it is particularly inconvenient to provide for the separate firing of two kinds of brick, without great inconvenience and additional expense, and if a separate kiln is provided for each kind of brick, the initial cost will be enormous and prohibitive, and as smaller quantities of dry pressed brick are ordinarily made, it would be impractical to fire them commercially and economically by this method.

In operating a tunnel kiln for firing stiff mud brick properly and thoroughly, it is necessary to maintain such a heat at the lower part of the firing zone or chamber of the kiln, as will insure the firing of the brick, and this necessarily means that the upper portion of the chamber is hotter than necessary or required for the purpose of firing that class of brick. It therefore follows that the upper layers on each car, as before stated, are darker than the lower layers. I have found, however, that in the manufacture of rough surfaced brick, in which the face of the brick, intended to show when the brick is laid, has been roughened by wires or otherwise when in the plastic state, for the purpose of giving it a certain texture, such textured surface brick of the same shade as a smooth brick or faced brick will appear, when laid, as several shades darker by reason of the shadows produced on the roughened surface.

In carrying out my present invention, I make use of the foregoing facts and I provide the transporting means, by which the bricks are moved through the kiln, ordinarily tunnel cars, with layers of different kinds of brick, superposed upon each other and so arranged that in the progress of the carload throughout the kiln, each kind of brick will be brought to a desired commercially finished condition by the normal temperature of the horizontal portion of the kiln through which it passes, so that two or more kinds of brick may be fired simultaneously on each car and subjected to the desired temperature conditions without the necessity of heating any portion of the kiln hotter than necessary, thus effecting a great economy of fuel and enabling the plant to produce continuously various kinds of brick in substantial accordance with the commercial demands therefor. For example, I may arrange on each car a series of bottom rows or layers of wire cut stiff mud bricks to a certain height, and on top of the stiff mud bricks I may superimpose a plurality of layers or rows of dry pressed brick, arranged at such a height above the bottom of the goods space of the kiln, that the dry pressed brick will, in passing through the firing zone or chamber, be acted upon by the higher temperature of the upper portion thereof, while the wire cut stiff mud brick will be acted upon by the relatively lower temperature of the lower portion of the firing chamber or zone, thus enabling both kinds of brick to be simultaneously fired at the proper temperature for each, obviating the necessity of separate firing for the two kinds of brick, facilitating the handling of both kinds of brick through the plant continuously, and effecting a great economy of operation and cost of manufacture.

As another example of the application of my invention, I may arrange upon each car bottom rows or layers of stiff mud brick, having roughened surfaces, and superimpose upon them rows of stiff mud brick having smooth surfaces, so that in passing through the firing chamber of the kiln, while the upper layers will be actually somewhat darker than the lower layers, the roughened brick will actually appear darker than they are and will be readily saleable.

As another example of the application of my invention, I may also load onto the same car a lower layer or layers of rough surfaced, stiff mud brick, superimposed upon them a plurality of layers of smooth stiff mud brick, and superimposed upon the latter, layers of dry pressed brick, which will pass through the hottest portion of the firing chamber, while the stiff mud brick will pass through the lower portions of intermediate and lower temperatures, with the result that all of them will be fired and brought to commercial condition simultaneously, without necessitating separate firings or special pre-heating of one portion of the firing chamber in order to secure the proper firing of brick in another portion.

As a matter of fact, this invention, which I have successfully carried into effect, results in a very material saving in the operation of a brick plant.

In some instances a brick plant will also manufacture quarry tile. These tile are usually made of very fine clay and constitute a denser product than ordinary stiff mud brick, and are usually made in the form of a thin, flat plate or tile, approximately one inch in thickness and in a variety of sizes, and are usually, although not necessarily, provided on their under side with longitudinal grooves. It follows that they require a high degree of heat to fire them and also that the dried tile before firing and during firing, must not be subjected to any severe weight or pressure which would naturally tend to break or warp them so as to make them unsaleable. As quarry tile are considered almost in a class with high grade porcelain tile, and must be more perfect in texture, form and burn than ordinary brick, any material quantity of defective quarry tile produced will effect a considerable loss in operation. I have found that these quarry tile can be readily burned in a tunnel kiln operated in accordance with my present invention, by superimposing them upon a sufficient number of layers of brick of one or other or any of the varieties hereinbefore mentioned, or others, so that they will occupy a position near the top of the kiln and not be subjected to any material superimposed weight. To this end, therefore, my invention contemplates the superimposing upon or in the upper layers on tunnel cars of layers of quarry tile or other flat tile, and preferably a plurality of such layers superimposed upon the layers of brick, so that they will be subjected to the highest temperature in the tunnel kiln without having to bear any superimposed weight except possibly the weight of a few layers of the tiles themselves.

In the accompanying drawing which illustrates one arrangement for carrying my invention into effect, Fig. 1 represents a cross section of the firing chamber of a single tunnel kiln and one of the tunnel cars therein, showing it loaded with layers of pressed brick superimposed upon layers of stiff mud brick.

Fig. 2 illustrates a tunnel car loaded with three different kinds of brick, the upper portion being pressed brick, the intermediate portion smooth finish stiff mud brick, and the lower portion rough surfaced stiff mud brick.

Fig. 3 is a similar view showing a car loaded with stiff mud brick, the upper layers being smooth finished and the lower layers rough finished.

Fig. 4 is a similar view showing a car loaded with three different kinds of brick, upon the upper layers of which are superimposed a plurality of layers of quarry tile or other flat tile.

Fig. 5 is a perspective view showing a quarry tile, such as is illustrated in Fig. 4.

In the accompanying drawings, 1 represents a cross section of a tunnel kiln which may be of any usual or preferred construction. I have shown a single tunnel kiln for convenience of illustration, but it will be understood that my invention is equally applicable to the firing of bricks in twin tunnel kilns of any usual or desired construction. I have, in this instance, provided the kiln with sidewalls, 2, and crown, 3, and the kiln may be of any desired length, ordinarily approximately 400 feet, of which the central portion constitutes the firing zone or chamber, one end portion constituting the preheating chamber and the other end portion constituting the cooling chamber, but the particular construction and arrangement of the kiln itself forms no part of my present invention.

In this instance I have shown the kiln provided in the central portion, or firing chamber, illustrated in Fig. 1, with an internal baffle wall, 4, provided at its upper end with an upwardly and inwardly extending deflector, 5, and forming between it and one of the walls, 2, a passage, 6, for the products of combustion from a series of furnaces, one of which is indicated at 7, supplied with fuel in any desired manner, in this instance by a fuel pipe, 8, air pipe, 9, and dampers or controlling valves, 10, 11, whereby the temperature of different portions of the firing chamber or zone, longitudinally thereof, may be controlled, so as to provide the desired, gradually increasing heat curve. I prefer to employ direct firing, as indicated in the drawing, and to withdraw the products of combustion from each furnace by means of a contiguous suction pipe or passage, indicated at 12, connected to a header 12ª, which is in turn connected with an exhaust device, not shown. The pipe, 12, for each furnace, is preferably provided with a damper, indicated at 12ᵇ, to facilitate the control of the furnaces. These details, however, are not essential to the invention and any other form of kiln may be employed. 13, represents the goods space through which the tunnel cars, one of which is indicated at 14, or other transporting means for the brick to be fired, pass longitudinally. The tunnel cars travel on longitudinal tracks, indicated at 15, in the usual manner, and I prefer to stack the bricks on the tunnel cars as they are formed, and to pass them while on said cars, through a drier, to extract occluded moisture therefrom, and then pass them to the kiln, but obviously, they may be dried in other ways and placed on the cars after drying, if preferred. Upon each tunnel car I arrange a plurality of superimposed layers in the usual or any desired manner. In Fig. 1, for example, I have shown the eight lower layers or rows of stiff mud brick, indicated at 16, and adapted to pass through the lower portion of the goods space of the firing chamber. Upon the uppermost layer, 16, of the stiff mud bricks, I superimpose a plurality of layers 17, of dry pressed brick, in this instance, eight rows in number, which are thus given an elevated position in the firing zone and are caused to traverse the upper portion thereof, which is, as before stated, hotter than the lower portion, thus providing for the proper firing of both kinds of brick, and subjecting the pressed brick to a higher temperature throughout their travel through the firing zone, than the stiff mud bricks are subjected to. It thus follows that by heating the kiln to a temperature sufficient to properly fire the stiff mud brick, the dry pressed brick will be fired without additional heat and great economy is thus effected.

In Fig. 1, I have indicated the dry pressed brick by shading to distinguish them from the stiff mud brick, which are not shaded. It will be readily seen that in carrying my invention into effect, the number of layers of one kind of brick or the other may be slightly varied from time to time to meet the commercial requirements which naturally vary, and all of the brick of each kind will be fired to a more nearly even color than would be the case if the entire car were piled with brick of one kind, so that sorting is largely or entirely avoided, and the necessity for storing a large quantity of brick which are not immediately needed for commercial demands, is practically avoided.

In Fig. 2, I have illustrated another application of my invention, in which the car, indicated at 114, is loaded with a plurality of lower layers, indicated at 118, of stiff mud rough surfaced brick, indicated by shading with a wavy line to distinguish them from the others on the car. As these rough surfaced brick appear darker than they really are, they require relatively lower temperature to fire them and bring them to commercial condition, than smooth faced brick of the same character. Above these are a plurality of rows of stiff mud brick having smooth texture, and indicated at 116, and the remaining upper layers of the load on the car comprise a dry pressed brick, indicated at 117. In this instance, the dry pressed brick will be subjected to the hotter temperature portion of the kiln, and the stiff mud brick will be fired at lower temperature, the rough surfaced brick, 118, being subjected to a lower temperature than the intermediately placed smooth surfaced brick. By this arrangement the pressed brick will receive the greatest heat and be properly fired, the smooth faced stiff mud brick will receive the next greatest heat and be properly fired, and the rough surfaced brick, which pass through the portions of lowest temperature in the kiln, will be properly fired, but will not be quite as dark as the smooth faced brick in the layers above, but, owing to their roughened surface, which causes them to appear darker when laid, they will be thoroughly marketable and will appear darker than a smooth surfaced brick burned under the same conditions and in the same location on the car.

In Fig. 3, I have shown another arrangement for carrying my invention into effect, in which the car indicated at 214, is loaded with a plurality of layers of rough surfaced stiff mud brick, indicated at 218, above which are a plurality of layers of smooth surfaced stiff mud brick, indicated at 216, there being no pressed brick used in this arrangement. The car so loaded passes through the kiln in which is maintained the proper temperature to secure the firing of the stiff mud brick with rough surfaces, indicated at 218, and occupying the lower part of the goods space in the kiln. The layers of smooth brick, 216, will necessarily receive a higher degree of heat than the rough surfaced brick, 218, which will actually be somewhat lighter in color, but by reason of their rough surface, will appear darker than they really are, thus bringing both kinds of brick to commercially fired condition with the minimum amount of heat.

It will be seen that in each of the various arrangements which are cited as examples of different ways in which my invention may be carried into effect, the kiln need only be heated to such temperature as will correctly fire the bricks occupying the lower layers on the cars, to insure bringing all of the bricks of the several kinds loaded on the cars to commercially fired condition, with a minimum of variation in color, and with very great economy of fuel and labor. In a single plant in which I have carried out my invention, I have effected an actual saving in the employment of my invention, of more than $20,000.00 in a single year.

In Fig. 4, I have shown one manner of loading where it is desired to burn tile, as quarry tile, in addition to bricks, in the tunnel kiln. In this instance the car is indicated at 314, and is shown loaded with three different kinds of brick, but obviously, so far as the location of the tile is concerned, it may be loaded with other combinations of brick or brick of any particular or desired kind. In the present instance, the first four layers, on the truck, indicated at 318, are stiff mud rough surfaced brick, the next six layers, for example, indicated at 316, are stiff mud smooth faced brick, the next four layers, for example, indicated at 317, are a pressed brick, and upon the uppermost layers of brick on the car are arranged a plurality of layers, indicated at 319, of quarry tile, one of which is shown at 319$^a$, in Fig. 5. It will be seen that these tile are thin, being substantially an inch in thickness and may be of any desired size, and are preferably provided on the under face with longitudinal grooves, indicated at 319$^b$. It will be clearly apparent that when these tile are in the dried condition, they will be liable to become broken or warped during their passage through the firing kiln, if they were piled on the car with heavy superimposed weight upon them, and I therefore preferably arrange them as shown in Fig. 4, on top of the topmost layer of brick. This has the further advantage that they are thus subjected to the hottest temperature of the firing zone of the tunnel in passing therethrough, and this is desirable, as the quarry tile, as before stated, are of greater density than stiff mud brick and require exposure to a higher temperature (or a high temperature for a longer period) than ordinary brick. By placing them at the top of the load on successive cars, a large output of quarry tile can be produced without danger of producing any material quantity of imperfect tile and without operating the kiln especially for the production of the quarry tile, thus effecting a great saving in labor and fuel, as it is only necessary to heat the firing zone of the kiln, as before stated, to such temperature as to bring the lowest layers of brick on the cars into commerical firing condition.

While I prefer to carry my invention into effect by the employment of tunnel cars and a tunnel kiln, I do not limit myself thereto, as other forms of brick conveying mechanism may be employed, and my invention is also applicable to other types of kiln in which superimposed rows of brick are simultaneously fired.

What I claim and desire to secure by Letters Patent is:—

1. The herein described process of firing brick, which consists in supporting a plurality of layers of brick, placing in the lower layers bricks requiring relatively lower temperature to fire them and bring them into commerical condition, and placing in the superposed layers brick requiring a higher temperature to fire them and bring them into commercial condition, and subjecting said layers, in an enclosing chamber, to heat sufficient to properly fire the brick of the lower layers, whereby the bricks of the upper layers will be subjected to a higher temperature and economy of fuel is attained.

2. The herein described process of firing brick, which consists in supporting a plurality of layers of brick upon movable conveying means, placing in the lower layers brick requiring relatively lower temperature to fire them and bring them into commercial condition, and placing in the upper layers brick requiring a relatively higher temperature to fire them and bring them into commercial condition, passing said layers of brick through an enclosing chamber and subjecting them to firing heat sufficient to properly fire the brick in the lower layers, the higher temperature at the upper portion of said chamber effecting the firing of the brick of the upper layers at a higher temperature and effecting economy of fuel.

3. The herein described process of firing brick, which consists in supporting a plurality of dry pressed brick in an elevated position above a plurality of stiff mud bricks, and simultaneously subjecting them to high temperature within an enclosing chamber.

4. The herein described process of firing brick, which consists in supporting a plurality of stiff mud brick and supporting a plurality of dry pressed brick above the stiff mud brick, passing them through an enclosing chamber and subjecting them to firing heat sufficient to fire the stiff mud brick, the temperature at the upper portion of said chamber effecting the firing of the dry pressed brick at a higher temperature than the temperature of the lower portion of said chamber, which effects the firing of the stiff mud brick.

5. The herein described process of firing brick, which consists in supporting a plurality of layers of stiff mud brick, superimposing thereupon a plurality of layers of dry pressed brick, and subjecting said brick to firing temperature within an enclosing chamber.

6. The herein described process of firing brick, which consists in supporting a plurality of layers of stiff mud brick, supporting thereon and above the same a plurality of layers of dry pressed brick and passing the brick longitudinally through an enclosing chamber and subjecting them simultaneously to firing temperature.

7. The herein described process of firing brick, which consists in supporting a plurality of layers of brick, supporting a plurality of layers of brick of greater density than the first mentioned brick, at a higher level with respect to and above said first mentioned brick, and subjecting all of said brick to firing temperature simultaneously within an enclosing chamber.

8. The herein described process of firing brick, which consists in supporting a plurality of layers of brick, the lower layers being composed of stiff mud brick having a roughened surface, and upper layers superimposed thereon being composed of stiff mud smooth brick, and subjecting said layers of brick to heat in an enclosing chamber.

9. The herein described process of firing brick, which consists in supporting a plurality of layers of brick, the lower layers being composed of stiff mud brick having a roughened surface, and upper layers superimposed thereon being composed of stiff mud smooth brick, and the uppermost layers being composed of dry pressed brick, and subjecting said layers of bricks simultaneously, in an enclosing chamber, to heat sufficient to fire the lowermost layers and bring them into commercial condition.

10. The herein described process of firing brick, which consists in loading tunnel cars with layers of brick, the lower layers comprising stiff mud brick having rough surfaces, upper layers comprising stiff mud brick having smooth surfaces, and the uppermost layers comprising dry pressed brick, passing said cars through the tunnel kiln and subjecting said bricks simultaneously to heat sufficient to fire the brick in the lowest layers and bring them into commercial condition, whereby the brick of the upper layers will be fired at higher temperature.

11. The herein described process of firing brick, which consists in loading tunnel cars with a plurality of layers of brick, the lower layers being composed of stiff mud brick requiring a pre-determined amount of heat to bring them into commercially fired condition, the upper layers being composed of dry pressed brick requiring a higher temperature to fire them, passing said cars so loaded through a tunnel kiln and subjecting the layers of brick on said cars to heat sufficient to secure the commercial firing of the bricks of the lower layer and simultaneously firing the dry pressed brick at a higher temperature.

12. The herein described process of firing brick, which consists in loading tunnel cars with superimposed layers of brick, the lowermost layers being composed of stiff mud brick having rough surfaces, and a plurality of layers superimposed thereon being composed of smooth surfaced stiff mud brick.

13. The herein described process of firing brick, which consists in loading tunnel cars with a plurality of layers of products to be fired, and superimposing upon them at the top of the load, a plurality of tile, passing the cars so loaded through a tunnel kiln and subjecting the contents of each car to heat sufficient to secure the commercial firing of the products in the lower layers and simultaneously firing said tile at a higher temperature and without superimposed weight or pressure.

14. The herein described process of firing brick, which consists in loading tunnel cars with a plurality of layers of brick, the lower layers being composed of brick requiring a pre-determined amount of heat to bring them into commercially fired condition, upper layers being composed of brick requiring a higher temperature to fire them, and superimposed upon the uppermost layers of brick, a plurality of horizontal layers of quarry tile, passing said cars so loaded through a tunnel kiln and subjecting the loads on said cars to heat sufficient to secure the commercial firing of the bricks of the lower layers, and simultaneously firing the bricks of upper layers at a higher temperature and said quarry tile at a still higher temperature, without subjecting said quarry tile to superimposed weight or pressure.

In testimony whereof I affix my signature.

WILLIAM LEE HANLEY, Jr.